(12) United States Patent
Hashimoto et al.

(10) Patent No.: US 10,279,866 B2
(45) Date of Patent: May 7, 2019

(54) BICYCLE TRANSMISSION DEVICE (71) Applicant: Shimano Inc., Sakai, Osaka (JP)

(72) Inventors: Akinori Hashimoto, Osaka (JP); Masako Itsukashi, Osaka (JP)

(73) Assignee: Shimano Inc., Osaka (JP)

( * ) Notice: Subject to any disclaimer, the term of this patent is extended or adjusted under 35 U.S.C. 154(b) by 84 days.

(21) Appl. No.: 15/171,474

(22) Filed: Jun. 2, 2016

(65) Prior Publication Data

US 2016/0375957 A1 Dec. 29, 2016

(30) Foreign Application Priority Data

Jun. 25, 2015 (JP) ................. 2015-127963

(51) Int. Cl.
*B62M 9/122* (2010.01)
*B62M 9/123* (2010.01)
*B62M 9/132* (2010.01)
*B62M 9/133* (2010.01)

(52) U.S. Cl.
CPC ............ *B62M 9/122* (2013.01); *B62M 9/123* (2013.01); *B62M 9/132* (2013.01); *B62M 9/133* (2013.01); *B62K 2207/02* (2013.01); *B62K 2207/04* (2013.01)

(58) Field of Classification Search
CPC .. B62M 25/08; B62J 99/00; B62J 2099/0013; B60L 11/007; B60L 2200/12
USPC ..................................................... 474/80, 82
See application file for complete search history.

(56) References Cited

U.S. PATENT DOCUMENTS

| | | | |
|---|---|---|---|
| 6,162,140 A | 12/2000 | Fukuda | |
| 6,796,396 B2* | 9/2004 | Kamen | A63C 17/12 180/272 |
| 7,276,899 B2* | 10/2007 | Guderzo | G01D 5/145 324/174 |
| 8,886,426 B2* | 11/2014 | Cheng | B62M 6/45 180/218 |
| 9,611,002 B1* | 4/2017 | Shum | B62M 6/50 |
| 9,656,672 B2* | 5/2017 | Schieffelin | B62M 9/122 |
| 2004/0167705 A1* | 8/2004 | Lingman | B60T 8/172 701/124 |
| 2006/0145688 A1* | 7/2006 | Guderzo | G01D 5/145 324/207.2 |
| 2009/0215561 A1* | 8/2009 | Fukuda | B62M 9/122 474/82 |
| 2010/0198453 A1* | 8/2010 | Dorogusker | A63B 24/0062 701/31.4 |
| 2012/0130603 A1* | 5/2012 | Simpson | B62M 9/123 701/51 |

(Continued)

FOREIGN PATENT DOCUMENTS

JP H07251786 A 10/1995
JP 8-26170 A 1/1996
(Continued)

*Primary Examiner* — Henry Y Liu
(74) *Attorney, Agent, or Firm* — Global IP Counselors, LLP (57) ABSTRACT

A bicycle transmission device is basically configured to improve the detection accuracy of the tilt angle of the road surface. The bicycle transmission device has a transmission for changing the gear ratio of the bicycle, and a tilt sensor disposed on the transmission and that outputs a signal that reflects the inclination of the transmission.

20 Claims, 7 Drawing Sheets

(56) References Cited

U.S. PATENT DOCUMENTS

| | | | | |
|---|---|---|---|---|
| 2012/0143443 | A1* | 6/2012 | Lewis | A61G 5/042 701/42 |
| 2012/0253601 | A1* | 10/2012 | Ichida | B60G 13/00 701/37 |
| 2012/0253606 | A1* | 10/2012 | Takamoto | B62J 15/00 701/48 |
| 2012/0261895 | A1* | 10/2012 | Cote | B62M 6/50 280/281.1 |
| 2013/0090819 | A1* | 4/2013 | Cheng | B62M 6/45 701/64 |
| 2013/0139634 | A1* | 6/2013 | Tauchi | B62M 25/08 74/473.13 |
| 2013/0144464 | A1* | 6/2013 | Dorogusker | A63B 24/0062 701/1 |
| 2013/0179016 | A1* | 7/2013 | Gale | B60L 3/0061 701/22 |
| 2013/0288834 | A1* | 10/2013 | Yamaguchi | B62M 9/126 474/80 |
| 2013/0345942 | A1* | 12/2013 | Staudinger | F16H 61/0213 701/65 |
| 2015/0073625 | A1* | 3/2015 | Jordan | B62K 23/02 701/2 |
| 2015/0160258 | A1* | 6/2015 | Zhang | G01P 15/18 702/141 |
| 2015/0367176 | A1* | 12/2015 | Bejestan | G06F 19/3481 482/9 |
| 2016/0280327 | A1* | 9/2016 | Tiso | B62M 9/122 |

FOREIGN PATENT DOCUMENTS

| | | |
|---|---|---|
| JP | 2000-177674 A | 6/2000 |
| JP | 2001280464 A | 10/2001 |
| JP | 3413886 B2 | 6/2003 |
| JP | 4145839 B2 | 9/2008 |
| JP | 2013-95306 A | 5/2013 |
| WO | 2012068265 A1 | 5/2012 |

\* cited by examiner

BICYCLE TRANSMISSION DEVICE

CROSS-REFERENCE TO RELATED APPLICATIONS

This application claims priority to Japanese Patent Application No. 2015-127963, filed on Jun. 25, 2015. The entire disclosure of Japanese Patent Application No. 2015-127963 is hereby incorporated herein by reference.

BACKGROUND

Field of the Invention

The present invention relates to a bicycle transmission device, a bicycle transmission control apparatus for controlling a transmission device, and a bicycle transmission control system equipped with a transmission.

Background Information

Conventionally, a bicycle transmission control apparatus is known that performs different controls of the transmission between a slope and a flat road. For example, a bicycle transmission control apparatus is disclosed in Japanese Laid-Open Patent Publication No. 2001-280464 that infers the tilt angle of a road surface based on a manual drive force applied to a crank and a vehicle speed of the bicycle.

SUMMARY

It has been found that the manual drive force applied to the crank and the bicycle vehicle speed are affected by factors other than the tilt angle of the road surface. Consequently, in the case of the bicycle transmission control apparatus described above, there is the risk that the tilt angle of the road surface will deviate from the actual tilt angle of the road surface.

An object of the present invention is to provide a bicycle transmission device, a bicycle transmission control apparatus for controlling a transmission device, and a bicycle transmission control system equipped with a transmission capable of improving the detection accuracy of the tilt angle of the road surface.

The bicycle transmission device according to one embodiment of the present invention comprises a transmission configured to change a gear ratio of a bicycle, and a tilt sensor disposed on the transmission and that outputs a signal that reflects the inclination of the transmission.

According to one embodiment of the bicycle transmission device, the transmission includes a derailleur, and the derailleur comprises a base member that is configured to be attached to a frame of the bicycle, a movable member that is configured to move with respect to the base member, and a coupling member that couples the base member and the movable member.

According to one embodiment of the bicycle transmission device, the tilt sensor is disposed on the base member. According to one embodiment of the bicycle transmission device, the tilt sensor has a sampling frequency that is less than or equal to 20 hertz.

According to one embodiment of the bicycle transmission device, the sampling frequency of the tilt sensor is less than or equal to 10 hertz. According to one embodiment of the bicycle transmission device, the sampling frequency of the tilt sensor is different from the oscillation frequency of the transmission when the transmission is operating.

According to one embodiment of the bicycle transmission device, the sampling frequency of the tilt sensor is less than the oscillation frequency of the transmission when the transmission is operating.

According to one embodiment of the bicycle transmission device, the tilt sensor is formed comprising at least one from among a gyro sensor and an acceleration sensor.

According to one embodiment of the bicycle transmission device, the transmission further comprises an actuator for changing the gear ratio by operating the transmission.

According to one embodiment of the bicycle transmission device further comprises a bicycle transmission control apparatus including a controller that is configured to control the actuator based on an output of the tilt sensor.

According to one embodiment of the bicycle transmission device, the controller is configured to control the actuator based on outputs of the tilt sensor, and of a vehicle speed sensor which outputs a signal that reflects a vehicle speed of the bicycle.

According to one embodiment of the bicycle transmission device, the output of the tilt sensor includes acceleration information, and the controller is configured to vary the control of the actuator based on the tilt sensor, between a first state in which an acceleration is greater than a first predetermined value and a second state in which the acceleration is less than or equal to the first predetermined value.

According to one embodiment of the bicycle transmission device, the controller is configured to not perform a change of the gear ratio based on the output of the tilt sensor, in the first state. According to one embodiment of the bicycle transmission device, the controller is configured to calculate the tilt angle of the bicycle based on the output of the tilt sensor.

According to one embodiment of the bicycle transmission device, the controller is configured to calculate the tilt angle of the bicycle based on the outputs of the tilt sensor and of the vehicle speed sensor.

According to one embodiment of the bicycle transmission control apparatus, the controller is configured to correct the tilt angle according to the gear shift stage of the transmission.

According to one embodiment of the bicycle transmission device, the controller comprises a storage unit that stores a correction value for each of the gear shift stages of the transmission, and corrects the tilt angle based on the correction value.

According to one embodiment of the bicycle transmission device, the controller is disposed on the transmission.

The bicycle transmission control system according to one embodiment of the present invention comprises a transmission device equipped with a transmission and an actuator configured to change the gear ratio of the bicycle by operating the transmission, a tilt sensor disposed on the bicycle and that outputs a signal that reflects the inclination of the bicycle, and a controller configured to control the actuator based on an output of the tilt sensor, in which a sampling frequency of the tilt sensor is less than or equal to 20 hertz.

The bicycle transmission control system according to one embodiment of the present invention comprises a transmission device equipped with a transmission and an actuator that is configured to change a gear ratio of a bicycle by operating the transmission, a tilt sensor disposed on the bicycle and that outputs a signal that reflects the inclination of the bicycle, and a controller for controlling the actuator based on an output of the tilt sensor, in which the output of the tilt sensor includes acceleration information, and the controller is configured to vary the control of the actuator based on the tilt sensor, between a first state in which the acceleration is greater than a first predetermined value and a second state in which the acceleration is less than or equal to the first predetermined value.

According to one embodiment of the bicycle transmission control system, the controller is configured to not perform a change of the gear ratio based on the output of the tilt sensor, in the first state.

The bicycle transmission device, the bicycle transmission control apparatus for controlling a transmission device, and the bicycle transmission control system equipped with a transmission of the present invention are capable of improving the detection accuracy of the tilt angle of the road surface.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
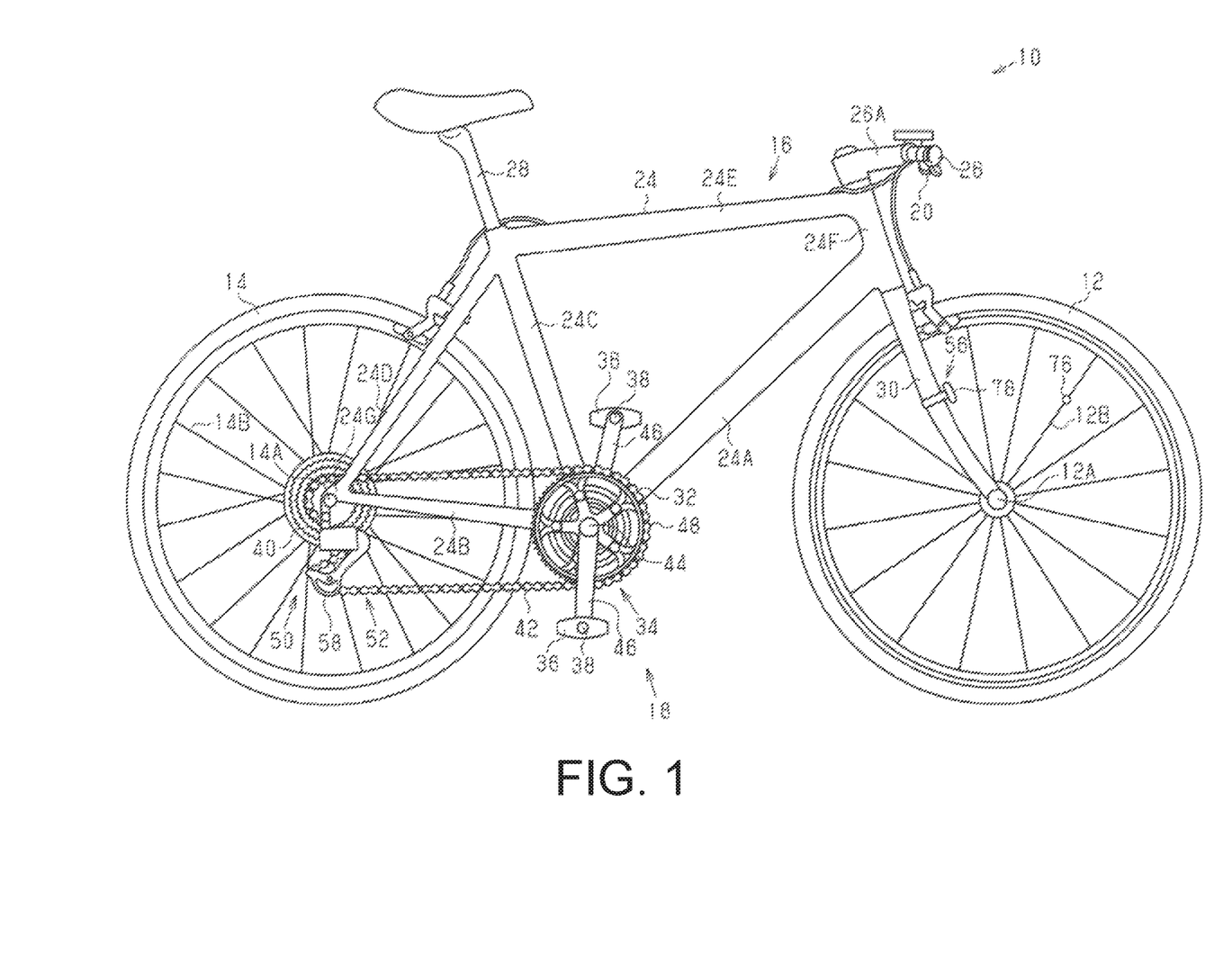
FIG. 1 is a side elevational view of a bicycle equipped with a bicycle transmission control system in accordance with a first embodiment.

Referring initially to FIG. 1, a bicycle 10 is illustrated that is equipped with a bicycle transmission control system in accordance with a first embodiment. The bicycle 10 comprises a front wheel 12, a rear wheel 14, a vehicle body 16, a drive mechanism 18, an operating device 20 and a transmission control system 50.

The vehicle body 16 comprises a frame 24, a handlebar 26, a seat post 28 and a front fork 30. The handlebar 26 is connected to the frame 24. The seat post 28 is connected to the frame 24. The front fork 30 is connected to the frame 24.

The frame 24 comprises a bottom bracket 32 for supporting a crankshaft 44 of the drive mechanism 18. The frame 24 comprises a down tube 24A, a chain stay 24B and a seat tube 24C. The down tube 24A extends forward from the bottom bracket 32. The chain stay 24B extends rearward from the bottom bracket 32. The seat tube 24C extends upward from the bottom bracket 32. Further, the frame 24 comprises a seat stay 24D, a top tube 24E and a head tube 24F. The seat stay 24D connects the rear end of the chain stay 24B and the upper end of the seat tube 24C. The top tube 24E extends forward from the upper end of the seat tube 24C. The head tube 24F connects the front end of the down tube 24A and the front end of the top tube 24E. A derailleur hanger 24G is disposed on the rear end of the chain stay 24B.

The handlebar 26 is detachably connected to the front fork 30 via a stem 26A. The seat post 28 is detachably connected to the seat tube 24C. The front fork 30 is supported to the head tube 24F and connected to an axle 12A of the front wheel 12.

The drive mechanism 18 comprises a crank assembly 34, a pair of (left and right) pedals 36, a pair of (left and right) pedal shafts 38, a plurality of rear sprockets 40 and a chain 42. The crank assembly 34 comprises a crankshaft 44, a pair of left and right crank arms 46 and a front sprocket 48. The crankshaft 44 is rotatably supported to the bottom bracket 32. The front sprocket 48 is connected to the crankshaft 44. The left and right crank arms 46 are attached to the crankshaft 44. The left and right pedals 36 are attached to the crank arms 46 so as to be rotatable around the pedal shafts 38.

The front sprocket 48 is coupled to the crankshaft 44 or one of the crank arms 46. The front sprocket 48 is provided coaxially with the crankshaft 44. The front sprocket 48 is coupled so as not to rotate relative to the crankshaft 44.

The rear sprockets 40 are rotatably attached to the rear wheel 14 around an axle 14A of the rear wheel 14. The rear sprockets 40 are coupled to the rear wheel 14 via a one-way clutch. The chain 42 is wound to the front sprocket 48 and one of the rear sprockets 40. When the crank shaft 44 is rotated by the manual drive force that is applied to the pedals 36, the rear wheel 14 is rotated by the front sprocket 48, the chain 42, and one of the rear sprockets 40.

The operating device 20 is attached to the handlebar 26. The operating device 20 is electrically connected to a controller 54 (refer to FIG. 3) of the transmission control system 50 by an unillustrated cable. When the operating device 20 is operated by an operator, the operating device 20 transmits an upshift signal or a downshift signal to the controller 54 (refer to FIG. 3). Upshift is a shift in the direction that the gear ratio $\gamma$ increases, and downshift is a shift in the direction that the gear ratio $\gamma$ decreases. It is also possible to connect the operating device 20 and the controller 54 (refer to FIG. 3) so as to communicate via wireless communications.

The transmission control system 50 comprises a transmission device 52, a controller 54 (refer to FIG. 3) and a vehicle speed detection device 56. The controller 54 (refer to FIG. 3) forms the transmission control apparatus of the bicycle 10 used with the transmission device 52.

Figure 3:
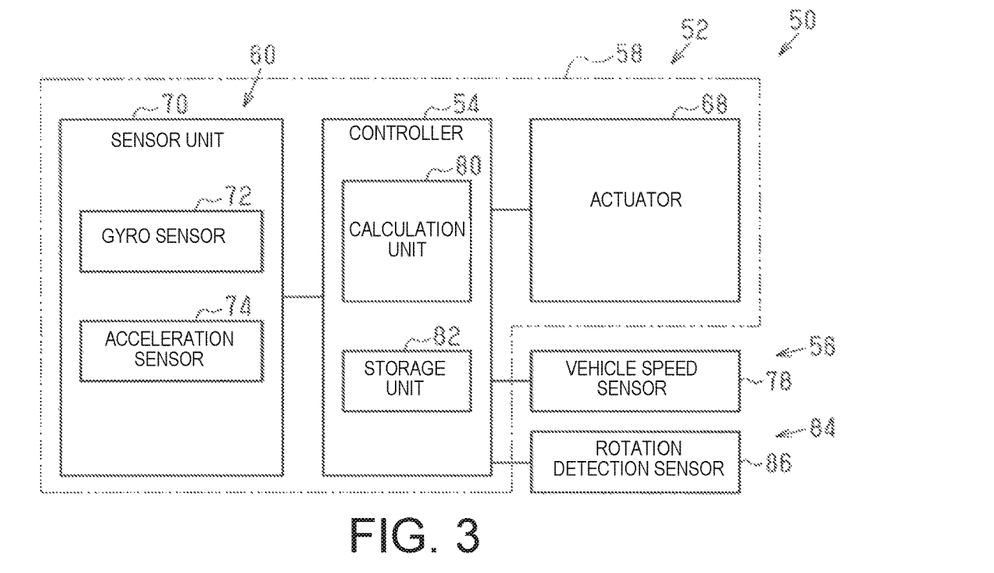
FIG. 3 is a block diagram of the transmission control system for the bicycle transmission device illustrated in FIG. 1.

As shown in FIG. 3, the transmission device 52 comprises a transmission 58 and a tilt sensor 60. The transmission 58 is configured to change the gear ratio $\gamma$ of the bicycle 10. The tilt sensor 60 is disposed on the transmission 58. The tilt sensor 60 is configured to output a signal that reflects the inclination of the transmission 58 with respect to horizontal (i.e., level ground).

Figure 2:
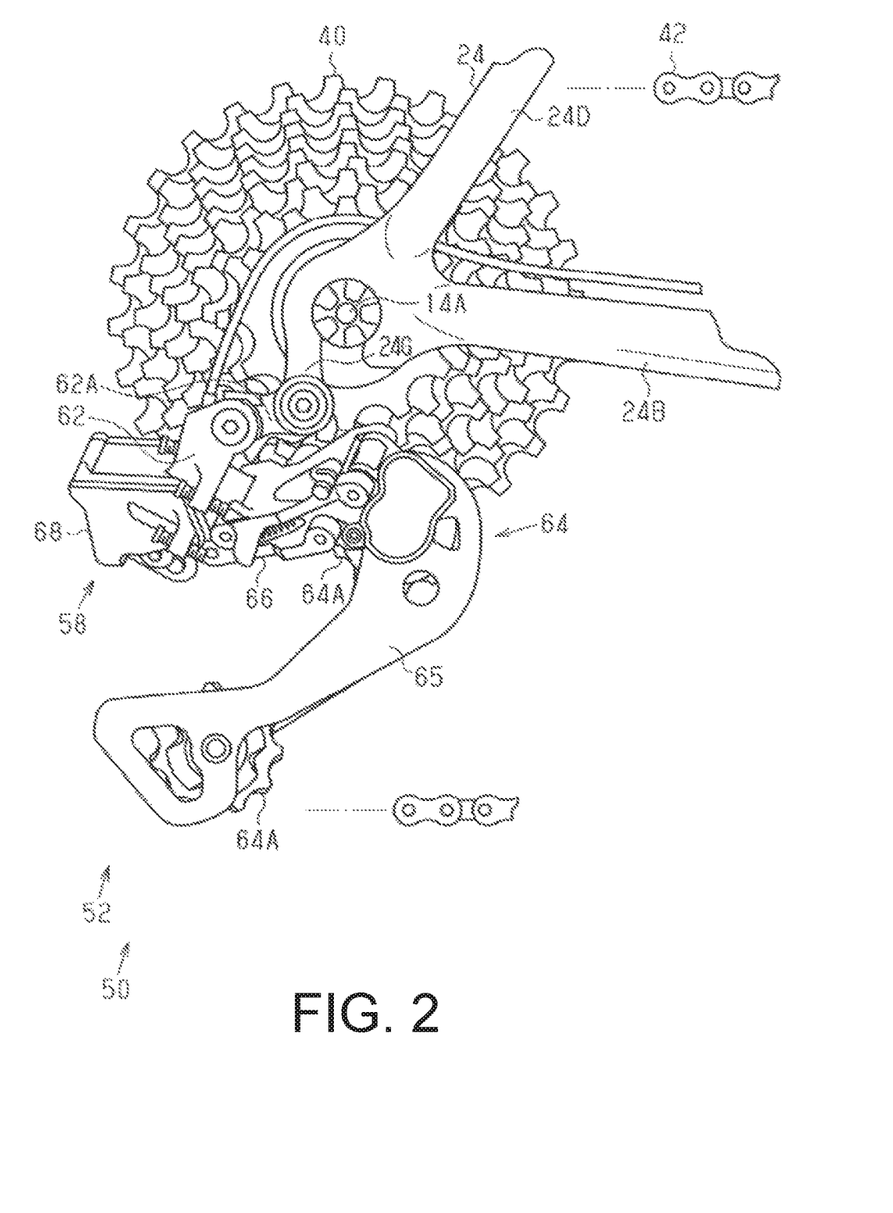
FIG. 2 is a side elevational view of a rear portion of the bicycle illustrated in FIG. 1 that includes the transmission control system that is mounted on a bicycle transmission device.

As shown in FIG. 2, the transmission 58 is a bicycle rear derailleur. The transmission 58 moves the chain 42 between the rear sprockets 40 which are able to establish different gear ratios $\gamma$. The gear shift stages of the transmission 58 correspond to each of the rear sprockets 40. The transmission 58 is attached to the derailleur hanger 24G of the frame 24 in the vicinity of the axle 14A of the rear wheel 14. The transmission 58 comprises a base member 62, a movable member 64, a coupling member 66 and an actuator 68. The base member 62 is attached to the frame 24 of the bicycle 10. The movable member 64 is movable with respect to the base member 62. The coupling member 66 couples the base member 62 and the movable member 64. The actuator 68 is operatively coupled to the coupling member 66 to move the movable member 64 with respect to the base member 62. The actuator 68 is, for example, an electric motor. The actuator 68, the controller 54 and the tilt sensor 60 are electrically connected to an unillustrated battery, and are supplied power from the battery. The battery can be disposed on the transmission 58. Alternatively, for example, the battery can be provided outside the transmission 58, such as the frame 24.

The base member 62 is attached to the frame 24 via a bracket 62A and a bolt or the like. The bracket 62A is fixed to the derailleur hanger 24G. The coupling member 66 connects the base member 62 and the movable member 64 so that the movable member 64 is movable with respect to the base member 62. The movable member 64 supports a chain guide 65. The chain guide 65 comprises a pair of pulleys 64A. The chain 42 is wound to the pulleys 64A.

The actuator 68 changes the gear ratio γ by operating the transmission 58. Specifically, the actuator 68 moves the coupling member 66 and the movable member 64 with respect to the base member 62. The transmission 58 switches the chain 42 between the rear sprockets 40 by driving the actuator 68 to change the gear ratio γ.

As shown in FIG. 3, the tilt sensor 60 comprises a sensor unit 70. The tilt sensor 60 is disposed on the base member 62 (refer to FIG. 2). The tilt sensor 60 can be provided inside the base member 62 (refer to FIG. 2), or attached on the outer surface of the base member 62 (refer to FIG. 2). The tilt sensor 60 is electrically connected to the controller 54 by an electrical cable.

The sensor unit 70 comprises a three-axis gyro sensor 72 and a three-axis acceleration sensor 74. Thus, the tilt sensor 60 comprises the gyro sensor 72 and the acceleration sensor 74. The output of the tilt sensor 60 includes the inclination angle of each of the three axes and the acceleration information of each of the three axes. The inclination angles of the three axes are a pitch angle θA, a roll angle θB, and a yaw angle θC. The three axes of the gyro sensor 72 preferably match with the three axes of the acceleration sensor 74. The sensor unit 70 is preferably attached to the transmission 58 so that the lateral direction of the vehicle body 16 (refer to FIG. 1) and the direction in which the axis of the pitch angle θA extends are substantially coincident.

The sampling frequency of the tilt sensor 60 is less than or equal to 20 hertz, and preferably less than or equal to 10 hertz. The sampling frequency of the tilt sensor 60 is preferably different from the oscillation frequency of the transmission 58 when the transmission 58 is operating. Furthermore, the sampling frequency of the tilt sensor 60 is preferably lower than the oscillation frequency of the transmission 58 when the transmission 58 is operating. An example of an oscillation frequency of the transmission 58 when the transmission 58 is operating is 90-110 hertz.

The vehicle speed detection device 56 shown in FIG. 1 detects the rotation of the front wheel 12. The vehicle speed detection device 56 comprises a magnet 76 and a vehicle speed sensor 78. The magnet 76 is attached to the spokes 12B of the front wheel 12. The vehicle speed sensor 78 is attached to the front fork 30. The magnet 76 can be attached to the spokes 14B of the rear wheel 14 as well. In this case the vehicle speed detection device 56 is attached to the chain stay 24B. The vehicle speed detection device 56 is fixed to the vehicle body 16 by bolts and nuts, a band, or the like. In the description below, the vehicle speed detection device 56 is configured to detect the rotation of the front wheel 12, but a case in which the vehicle speed detection device 56 detects the rotation of the rear wheel 14 only replaces the front wheel 12 with the rear wheel 14, so the description thereof will be omitted.

The vehicle speed sensor 78 is electrically connected to the controller 54 (refer to FIG. 3) by a cable. The vehicle speed sensor 78 comprises an element (not shown) that outputs a value corresponding to changes in the relative position with the magnet 76. The element is realized by a magnetic reed that configures a reed switch, a Hall Effect element, or the like. The vehicle speed sensor 78 outputs the output of the element (not shown) to the controller 54 shown in FIG. 3. The controller 54 calculates the travel distance per unit of time (hereinafter referred to as "vehicle speed V") based on the circumferential length of the front wheel 12 (refer to FIG. 1), which is stored in advance. That is, the vehicle speed sensor 78 outputs a signal that reflects the vehicle speed V of the bicycle 10.

The transmission control system 50 further comprises a crank rotation detection device 84. The crank rotation detection device 84 comprises one of the crank arms 46 shown in FIG. 1, a magnet (not shown) attached to the front sprocket 48 or the crankshaft 44, and a rotation detection sensor 86 (refer to FIG. 3) that is attached to the frame 24. The rotation detection sensor 86 shown in FIG. 3 is electrically connected to the controller 54 by a cable. The rotation detection sensor 86 comprises an element (not shown) that outputs a value corresponding to changes in the relative position with one of the crank arms 46. The element is realized by a magnetic reed that configures a reed switch, a Hall Effect element, or the like.

The controller 54 shown in FIG. 3 is disposed on the transmission 58. The controller 54 is preferably disposed on the base member 62 (refer to FIG. 2). The controller 54 can be provided inside the base member 62 (refer to FIG. 2), or attached on the outer surface of the base member 62 (refer to FIG. 2). The controller 54 comprises a storage unit 82 and a calculation unit 80 for performing various calculations. The controller 54 also preferably includes other conventional components such as an input interface circuit, an output interface circuit. The controller 54 is preferably a microcomputer in which the calculation unit 80 includes a one or more processors. The storage unit 82 is preferably any memory device (i.e., anon-transitory computer readable medium such as a ROM (Read Only Memory) device and a RAM (Random Access Memory) device, hard disk, etc.). The storage unit 82 is configured to store programming, data, calculations and/or results. In the illustrated embodiment, the storage unit 82 has an automatic shifting program prestored therein for shifting the transmission 58.

The controller 54 is configured (programmed) to calculate the tilt angle θ of the bicycle 10 based on the outputs of the tilt sensor 60 and the vehicle speed sensor 78. The tilt angle θ is a rotational angle around an axis that extends in the lateral direction of the vehicle body 16 (refer to FIG. 1). The tilt angle θ is set to be "0 degrees" when the vehicle body 16 is placed in a flat location (i.e., a level horizontal surface). Accordingly, the tilt angle θ correlates with the gradient of the traveling road surface of the bicycle 10.

Figure 4:
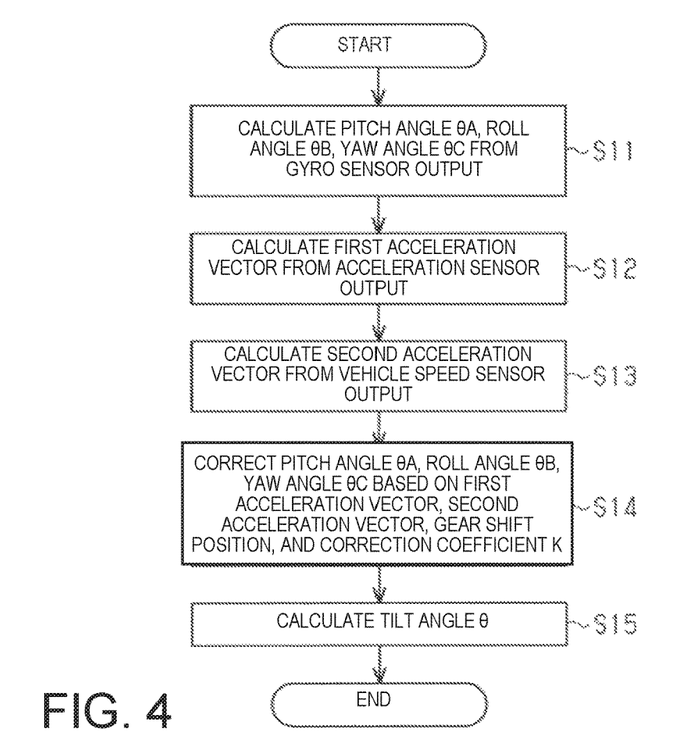
FIG. 4 is a flowchart of the calculation process of the tilt angle executed by the controller of FIG. 3.

The calculation process of the tilt angle θ will be described with reference to FIG. 4. The controller 54 calculates the pitch angle θA, the roll angle θB, and the yaw angle θC from the output of the gyro sensor 72, in step S11. The controller 54 calculates a first acceleration vector in the longitudinal direction of the vehicle body 16 (refer to FIG. 1) from the acceleration sensor 74, in step S12. The controller 54 calculates a second acceleration vector from the output of the vehicle speed sensor 78, in step S13.

The controller 54 is configured (programmed) to correct the pitch angle θA, the roll angle θB, and the yaw angle θC based on the first acceleration vector, the second acceleration vector, and the gear shift stage, to reduce errors included in the pitch angle θA, the roll angle θB, and the yaw angle θC, in step S14. Specifically, the controller 54 calculates the correction angle for each of the pitch angle θA, the roll angle θB, and the yaw angle θC, based on the difference between the first acceleration vector and the second acceleration vector. The controller 54 multiplies the correction coefficient K to the correction angle and adds the correction angle after the multiplication to the pitch angle θA, the roll angle θB, and the yaw angle θC. The correction coefficient K is set according to the magnitude of the first acceleration vector (hereinafter referred to as "first acceleration"). The correction coefficient K is set to be smaller as the first acceleration increases. Further, the correction coefficient K of during a predetermined period after an upshift signal or a downshift signal is outputted to the transmission 58 is set to be smaller than the correction coefficient K after the predetermined period has elapsed.

The tilt sensor 60 changes inclination with respect to the frame 24 according to the gear shift stage of the transmission 58. Accordingly, a correction table is stored in the storage unit 82 with the correction values ΔθA, ΔθB, ΔθC for each gear shift stage of the transmission 58. Table 1 shows one example of the correction table. The absolute values of the correction values ΔθA and the correction values ΔθB are increased as the gear shift stage is increased, with the first stage as the reference. The controller 54 corrects the pitch angle θA, the roll angle θB, and the yaw angle θC based on the correction values ΔθA, ΔθB, and ΔθC. That is, the controller 54 corrects the tilt angle θ according to the gear shift stage of the transmission 58.

TABLE 1

|  |  | Pitch Angle Correction Value ΔθA | Roll Angle Correction Value ΔθB | Yaw Angle Correction Value ΔθC |
|---|---|---|---|---|
| Gear Shift Position | 1 | 0 | 0 | 0 |
|  | 2 | −1.6546 | −0.3367 | 0 |
|  | 3 | −3.8854 | −0.944 | 0 |
|  | 4 | −6.1162 | −1.5513 | 0 |
|  | 5 | −8.347 | −2.1586 | 0 |
|  | 6 | −10.5778 | −2.7659 | 0 |
|  | 7 | −12.8086 | −3.3732 | 0 |
|  | 8 | −15.0394 | −3.9805 | 0 |
|  | 9 | −17.2702 | −4.5878 | 0 |
|  | 10 | −19.501 | −5.1951 | 0 |
|  | 11 | −21.7318 | −5.8024 | 0 |

The controller 54 calculates the tilt angle θ based on the pitch angle θA, the roll angle θB, and the yaw angle θC that are corrected in step S14, the initial value of the tilt angle of the transmission 58, and the gear shift stage, in step S15. The initial value of the tilt angle of the transmission 58 is the tilt angle of when setting the gear shift stage of the transmission 58 to the first stage, when placing the bicycle 10 on flat level ground. The tilt angle θ can be calculated based on the pitch angle θA, the roll angle θB, and the correction values ΔθA, ΔθB, and ΔθC, when the sensor unit 70 is attached to the transmission 58, so that the lateral direction of the vehicle body 16 (refer to FIG. 1) and the direction in which the axis of the pitch angle θA extends are substantially coincident. Further, the tilt angle θ can be calculated based on the pitch angle θA and the correction values ΔθA, ΔθB, and ΔθC, when the sensor unit 70 is attached to the transmission 58, so that the lateral direction of the vehicle body 16 (refer to FIG. 1) and the direction in which the axis of the pitch angle θA extends are substantially coincident, and the longitudinal direction of the vehicle body 16 (refer to FIG. 1) and the direction in which the axis of the roll angle OB extends are substantially coincident.

Figure 5:
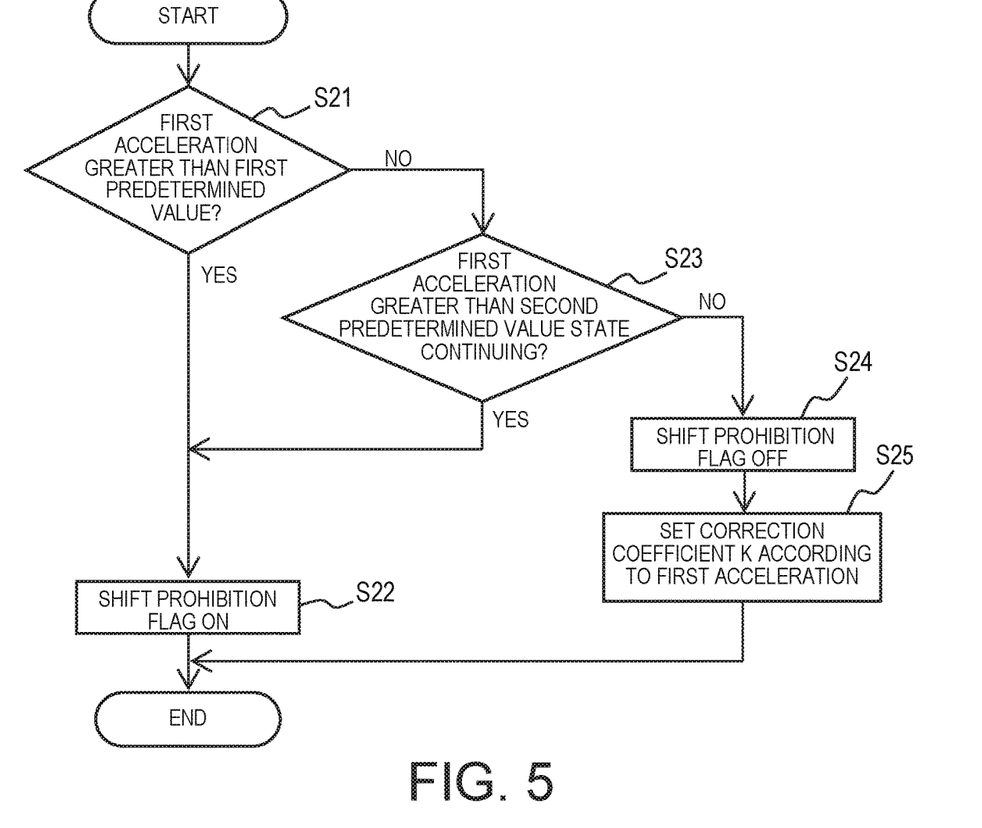
FIG. 5 is a flowchart of a setting process using acceleration executed by the controller of FIG. 3.

The setting process using acceleration will be set with reference to FIG. 5. The controller 54 determines whether or not the first acceleration which is calculated based on the output of the acceleration sensor 74 is greater than a first predetermined value, in step S21. If the first acceleration is greater than the first predetermined value, then a shift prohibition flag is set to ON in step S22 and the present step is ended. That is, the controller 54 is configured to vary the control of the actuator 68 based on the tilt sensor 60 between a first state in which an acceleration is greater than a first predetermined value, and a second state in which the acceleration is less than or equal to the first predetermined value. The controller 54 does not perform a change of the gear ratio γ based on the output of the tilt sensor 60, in the first state.

On the other hand, when the first acceleration is equal to or less than a first predetermined value in step S21, the controller 54 proceeds to step S23 and determines whether or not the state in which the first acceleration is greater than the second predetermined value is continuing. For example, if the state in which the first acceleration is greater than the second predetermined value has continued for a predetermined period, or, in the most recent detection cycle, if the number of times that the state in which the first acceleration is greater than the second predetermined value is detected is a predetermined ratio or greater, a shift prohibition flag is set to ON in step S22, and the present step is ended.

If the state in which the first acceleration is less than or equal to the second predetermined value has not continued, then the controller 54 sets the shift prohibition flag to OFF in step S24. That is, the controller 54 permits a change in the gear ratio γ based on the output of the tilt sensor 60. Next, the controller 54 sets a correction coefficient K according to the first acceleration in step S25, and ends the present step.

The controller 54 is configured to calculate the rotational frequency of the crankshaft 44 per unit of time (hereinafter referred to as "crank rotational frequency N") based on the output of the rotation detection sensor 86. The crank rotational frequency N is a parameter representing the running state of the bicycle 10. Meanwhile, the controller 54 can be configured to calculate the crank rotational frequency N based on the output of the vehicle speed sensor 78. In this case, the controller 54 can calculate the crank rotational frequency N from the vehicle speed V and the gear ratio γ. If a stage number detection sensor for detecting the gear shift stage is disposed on the transmission 58 and the gear ratio γ corresponding to the gear shift stage is stored in the storage unit 82 of the controller 54, the controller 54 can calculate the crank rotational frequency N from the detection result of the stage number detection sensor. Further, the controller 54 can calculate the crank rotational frequency N based on the output of the vehicle speed sensor 78 and can calculate the crank rotational frequency N based on the output of the rotation detection sensor 86. Especially, when coasting, the vehicle speed is greater than "0" but the crank rotational frequency N detected by the rotation detection sensor will be "0" so it is preferable to calculate the crank rotational frequency N based on the vehicle speed V. Therefore, the controller 54 can use the crank rotational frequency N calculated based on the vehicle speed V only when the actual crank rotational frequency N that is detected by the rotation detection sensor 86 is less than the crank rotational frequency N that is calculated based on the vehicle speed V.

The controller 54 compares the crank rotational frequency N to an upper limit value NA and a lower limit value NB, and then controls the transmission 58 so that the crank rotational frequency N falls within a predetermined range. The upper limit value NA and the lower limit value NB are set according to the tilt angle θ. That is, the controller 54 controls the actuator 68 based on the outputs of the tilt sensor 60 and the vehicle speed sensor 78. For example, the upper limit value NA and the lower limit value NB are set to be smaller as the tilt angle θ increases. In this case, the transmission 58 is controlled so that the crank rotational frequency N is maintained at a relatively small value as the tilt angle θ is increased, that is, when the gradient of an uphill road surface is large. On the other hand, the transmission 58 is controlled so that the crank rotational frequency N is maintained at a relatively large value when the tilt angle θ is small, that is, when traveling on a flat road or downhill.

The shifting process that is executed by the controller 54 is described with reference to FIG. 6. The controller 54 controls the transmission 58 based on the tilt angle θ and the crank rotational frequency N. That is, the transmission device 52 performs shifting automatically.

The controller 54 determines whether or not the shift prohibition flag is OFF in step S31. When the shift prohibition flag is set to OFF, the controller 54 proceeds to step S32. On the other hand, when the shift prohibition flag is set to ON, the controller 54 ends the present step.

The controller 54 determines whether or not the tilt angle θ is less than a predetermined angle θX in step S32. When the tilt angle θ is less than the predetermined angle θX, the controller 54 proceeds to step S33. The predetermined angle θX, for example, is selected to be an angle that corresponds to the slope angle of the road surface being in the range of 2%-10%. The predetermined angle θX is stored in the storage unit 82 of the controller 54. For example, an input device such as a cycle computer or an external device such as a personal computer can be connected to an input interface of the controller 54, and the predetermined angle θX can be set or changed by these devices.

The controller 54 determines whether or not the crank rotational frequency N is equal to or greater than the upper limit value NA in step S33. If the crank rotational frequency N is greater than or equal to the upper limit value NA, the controller 54 outputs an upshift signal is step S34, and ends the present step.

If the crank rotational frequency N is less than the upper limit value NA in step S33, then the controller 54 determines whether or not the crank rotational frequency N is less than or equal to the lower limit value NB in step S35. If the crank rotational frequency N is less than or equal to the lower limit value NB, the controller 54 outputs a downshift signal is step S36, and ends the present step.

If the crank rotational frequency N is greater than the lower limit value NB in step S35, that is, if the crank rotational frequency N falls within the range from the lower limit value NB to the upper limit value NA, then the controller 54 does not output an upshift signal or a downshift signal, and ends the present step.

If the tilt angle γ is greater than or equal to the predetermined angle θX in step S32, then the controller 54 proceeds to step S37. The controller 54 determines whether or not the crank rotational frequency N is greater than or equal to an upper limit value NC in step S37. The upper limit value NC is selected to be a value exceeding the upper limit value NA. The upper limit value NC is selected to be a value that is, for example, greater than the upper limit value NA by 20 rpm. If the crank rotational frequency N is greater than or equal to the upper limit value NC, then the controller 54 outputs an upshift signal in step S38, and ends the present step.

If the crank rotational frequency N is less than the upper limit value NC in step S37, then the controller 54 determines whether or not the crank rotational frequency N is less than or equal to a lower limit value ND in step S39. The lower limit value ND is selected to be a value less than the lower limit value NB. The lower limit value ND is selected to be a value that is, for example, less than the lower limit value NB by 3 rpm. If the crank rotational frequency N is less than or equal to the lower limit value ND, then the controller 54 outputs a downshift signal is step S40, and ends the present step.

If the crank rotational frequency N is greater than the lower limit value ND in step S39, that is, if the crank rotational frequency N falls within the range from the lower limit value ND to the upper limit value NC, then the controller 54 does not output an upshift signal or a downshift signal, and ends the present step.

By controlling the transmission 58 based on the tilt angle θ and the crank rotational frequency N, the controller 54 is able to perform an optimal shift control according to the tilt angle of the road surface. Here, if the tilt angle of the road surface is increased, shifting down becomes easier when the crank rotational frequency N is decreased; therefore, the controller 54 is able to shift in a direction in which the gear ratio γ is decreased before the vehicle speed V is completely reduced, and it becomes easier for the bicycle 10 to travel uphill.

The action and effects of the controller 54 will be described. As mentioned above, the bicycle 10 comprises the tilt sensor 60 that outputs a signal that reflects the inclination of the bicycle 10. When the bicycle 10 is carrying out a normal traveling, the tilt angle θ and the tilt angle of the road surface do not easily deviate. Accordingly, the pitch angle θA that is calculated from the output of the tilt sensor 60 reflects well the tilt angle of the road surface. Accordingly, the tilt angle of the road surface can be accurately detected.

The shape of the frame 24 is different depending on the bicycle 10. Consequently, in a configuration in which a tilt sensor that is separate from the frame 24 is attached to the frame 24, there is the risk that an attaching space cannot be secured, or that attaching becomes difficult, degrading the usability.

According to the bicycle 10, since the tilt sensor 60 is disposed on the transmission 58, the tilt of the bicycle can be detected by simply attaching the transmission 58 to the frame 24, thereby improving usability.

The tilt sensor 60 is disposed on the base member 62. Compared to the movable member 64 and the coupling member 66, the position of the base member 62 with respect to the frame 24 does not change, or is not easily changed for each gear shift stage. Accordingly, the calculation accuracy of the tilt angle θ is improved.

The sampling frequency of the tilt sensor 60 is less than or equal to 20 hertz, and preferably less than or equal to 10 hertz. That is, the sampling frequency of the tilt sensor 60 is different from the general oscillation frequency of the transmission 58 when the bicycle is traveling. Accordingly, noise is not likely to be included in the output of the tilt sensor 60, and the calculation accuracy of the tilt angle θ is improved. Further, the sampling frequency of the tilt sensor 60 is lower than the range of the general oscillation frequency of the transmission 58 when the bicycle 10 is traveling. Accordingly, noise is even less likely to be included in the output of the tilt sensor 60. That is, the transmission control system 50 can reduce the influence of disturbance that acts on the tilt sensor 60.

The sampling frequency of the tilt sensor 60 is preferably different from the oscillation frequency of the transmission 58 when the transmission 58 is operating. Accordingly, noise is not likely to be included in the output of the tilt sensor 60, and the calculation accuracy of the tilt angle θ is improved.

The sampling frequency of the tilt sensor 60 is preferably lower than the oscillation frequency of the transmission 58 when the transmission 58 is operating. Accordingly, noise is even less likely to be included in the output of the tilt sensor 60.

As mentioned above, the tilt sensor 60 is formed comprising the gyro sensor 72 and the acceleration sensor 74. Accordingly, the calculation accuracy of the tilt angle θ is improved, compared to when not comprising an acceleration sensor 74.

The controller 54 is configured (programmed) to control the actuator 68 based on the output of the tilt sensor 60. Accordingly, the transmission 58 can be operated so that the gear ratio γ corresponds to the gradient of the road surface that is being traveled.

The controller 54 is configured (programmed) to the actuator 68 based on the outputs of the tilt sensor 60 and the vehicle speed sensor 78. Accordingly, the transmission 58 can be operated so that the crank rotational frequency N corresponds to the gradient of the road surface that is being traveled.

In a situation in which the acceleration is increased, such as when riding over bumps or unlevel areas in the road surface, there is the risk that the output of the tilt sensor 60 is greatly changed. The controller 54 is configured (programmed) not to perform a change of the gear ratio γ based on the output of the tilt sensor 60, in a first state in which the acceleration is greater than a first predetermined value. Accordingly, when the output of the tilt sensor 60 is greatly changed due to riding over bumps, potholes, unlevel areas, etc., the transmission 58 is not operated even if the crank rotational frequency N becomes greater than or equal to the upper limit value NA or less than or equal to the lower limit value NB.

The controller 54 is configured (programmed) to calculate the tilt angle θ based on the outputs of the tilt sensor 60 and the vehicle speed sensor 78. That is, since an error of the acceleration sensor 74 can be inferred based on the output of the vehicle speed sensor 78, the calculation accuracy of the tilt angle θ is improved.

The controller 54 is disposed on the transmission 58. Accordingly, the transmission control system 50 can be made compact, compared to when attaching the controller 54 to the frame 24 or the like.

The specific form that the present transmission control system can take is not limited to the forms illustrated in the above-described embodiment. The present transmission control system can take various forms different from the above-described embodiment. The modified example of the above-described embodiment shown below is one example of the various forms that the present transmission control system can take.

Figure 7:
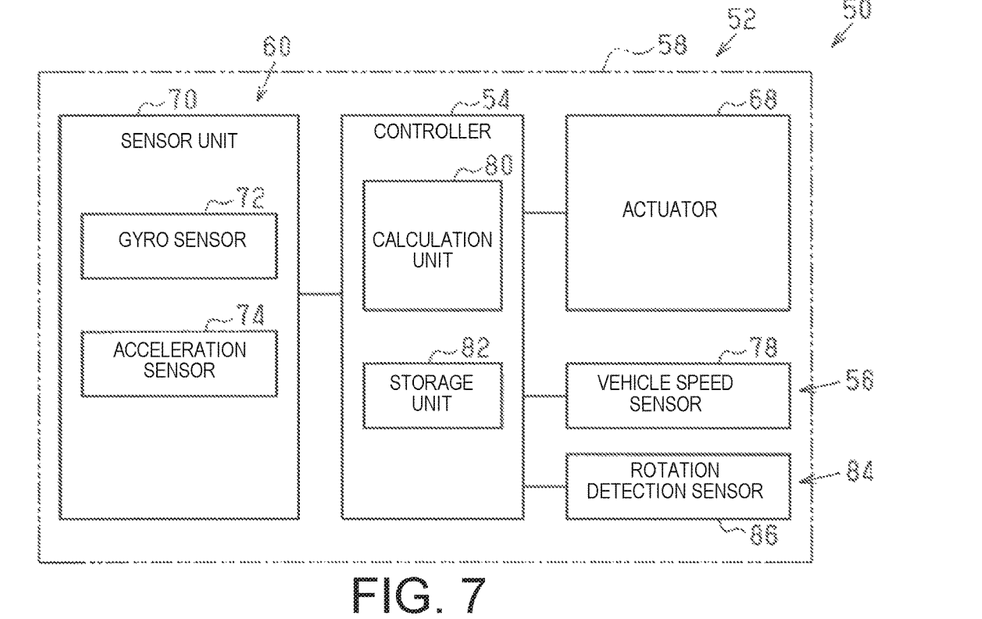
FIG. 7 is a block diagram of a transmission control system of a modified example of the embodiment.

As shown in FIG. 7, the vehicle speed detection device 56 can be disposed on the transmission 58 as well. In this case, for example, the magnet 76 is disposed on one of the pulleys 64A, and the vehicle speed sensor 78 is disposed on the chain guide 65 or the coupling member 66. The vehicle speed sensor 78 outputs a signal corresponding to the rotational speed of the pulley 64A, which reflects the vehicle speed V. The controller 54 is configured (programmed) to calculate the vehicle speed V based on the output of the vehicle speed sensor 78, the circumferential length of the pulley 64A, and the gear ratio γ. The pulley 64A can be configured as a dynamo, and the rotation pulse of the dynamo, which is a signal that reflects the vehicle speed V, can be outputted to the controller 54 as well. In this case, by not providing a one-way clutch between the rear sprockets 40 and the chain 42 but rather providing a one-way clutch between the crankshaft 44 and the front sprocket 48, the pulley 64A can be rotated even when the bicycle 10 is traveling and the rotation of the crankshaft 44 is stopped. Accordingly, the vehicle speed V can be detected by the vehicle speed detection device 56, even when the rotation of the crankshaft 44 is stopped.

The vehicle speed detection device 56 can also be configured as a GPS (Global Positioning System) receiver. In this case, the vehicle speed V is calculated based on positional information and travel time. The vehicle speed detection device 56 can be configured by a crank rotation detection device 84. In this case, the vehicle speed V is calculated based on the crank rotational frequency N, the gear ratio γ, and the circumferential length of the rear wheel 14.

The sampling frequency of the tilt sensor 60 can greater than 30 hertz as well. In this case, noise being included in the output at the time of a shifting operation of the transmission 58 can be suppressed, by varying the sampling frequency of the tilt sensor 60 and the oscillation frequency of the transmission 58 at the time of the shifting operation. Further, noise being included in the output can be suppressed by varying the sampling frequency of the tilt sensor 60 and the general oscillation frequency of the transmission 58 when the bicycle 10 is traveling.

Figure 8:
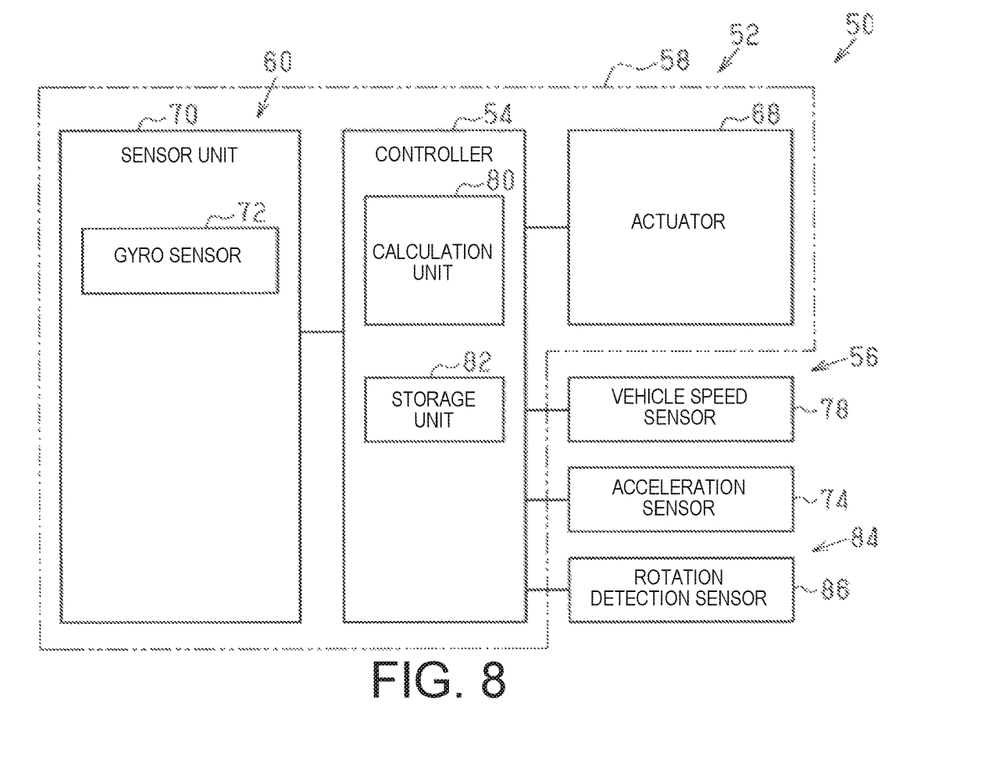
FIG. 8 is a block diagram of a transmission control system of a modified example of the embodiment.

The acceleration sensor 74 can be omitted from the tilt sensor 60 as well. In this case, as shown in FIG. 8, the acceleration sensor 74 can be provided outside of the transmission 58. The transmission 58 can be a front derailleur as well. In this case, the tilt sensor 60 is disposed on the front derailleur. The front derailleur is attached to the frame 24, preferably to the seat tube 24C, in the vicinity of the crankshaft 44. The front derailleur switches the chain 42 between a plurality of front sprockets by a drive of an actuator (not shown) disposed on the front derailleur, to change the gear ratio γ of the bicycle 10.

The transmission 58 can comprise a front derailleur and a rear derailleur. In this case, the tilt sensor 60 is disposed on one of the front derailleur and the rear derailleur. In the case that the front derailleur and the rear derailleur are controlled automatically, the controller 54 controls at least one of the front derailleur and the rear derailleur to performing shifting according to a gear ratio γ order that is set in advance.

The controller 54 can be disposed on the vehicle body 16, such as the frame 24, the handlebar 26, or the stem 26A. The transmission 58 can be changed to an internal type transmission. For example, a transmission that is attached around an axle 14A of the rear wheel 14 and built into the hub shell can be employed. In this case, the tilt sensor 60 can be provided inside the hub shell or provided outside the hub shell.

The tilt sensor 60 can be disposed on the crank assembly 34 as well. Specifically, the tilt sensor 60 is disposed on the crankshaft 44, the crank arms 46, or the front sprocket 48. In this case, the controller 54 can detect the tilt angle θ, giving consideration to the detection result of the rotation detection sensor 86.

The tilt sensor 60 can be disposed on the operating device 20 as well. Further, in a bicycle 10 in which the operating device 20 and an operating device that operates the brake of the bicycle 10 are separately provided, the tilt sensor 60 can be disposed on the operating device that operates the brake.

Figure 9:
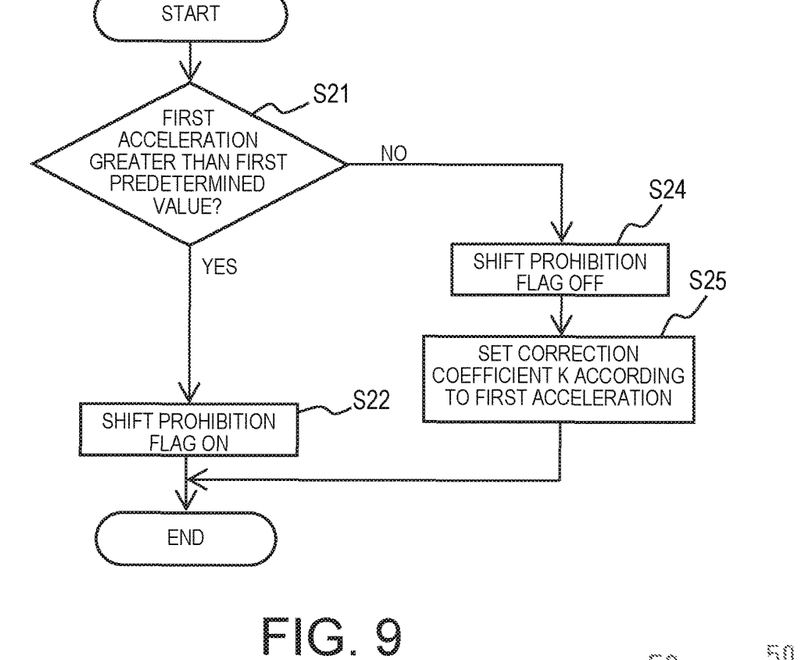
FIG. 9 is a flowchart of a shifting process executed by the controller of a modified example of the embodiment.

As shown in FIG. 9, in the setting process, step S23 can be omitted, and if the first acceleration is greater than the first predetermined value, the shift prohibition flag can be set to OFF in step S24.

Figure 6:
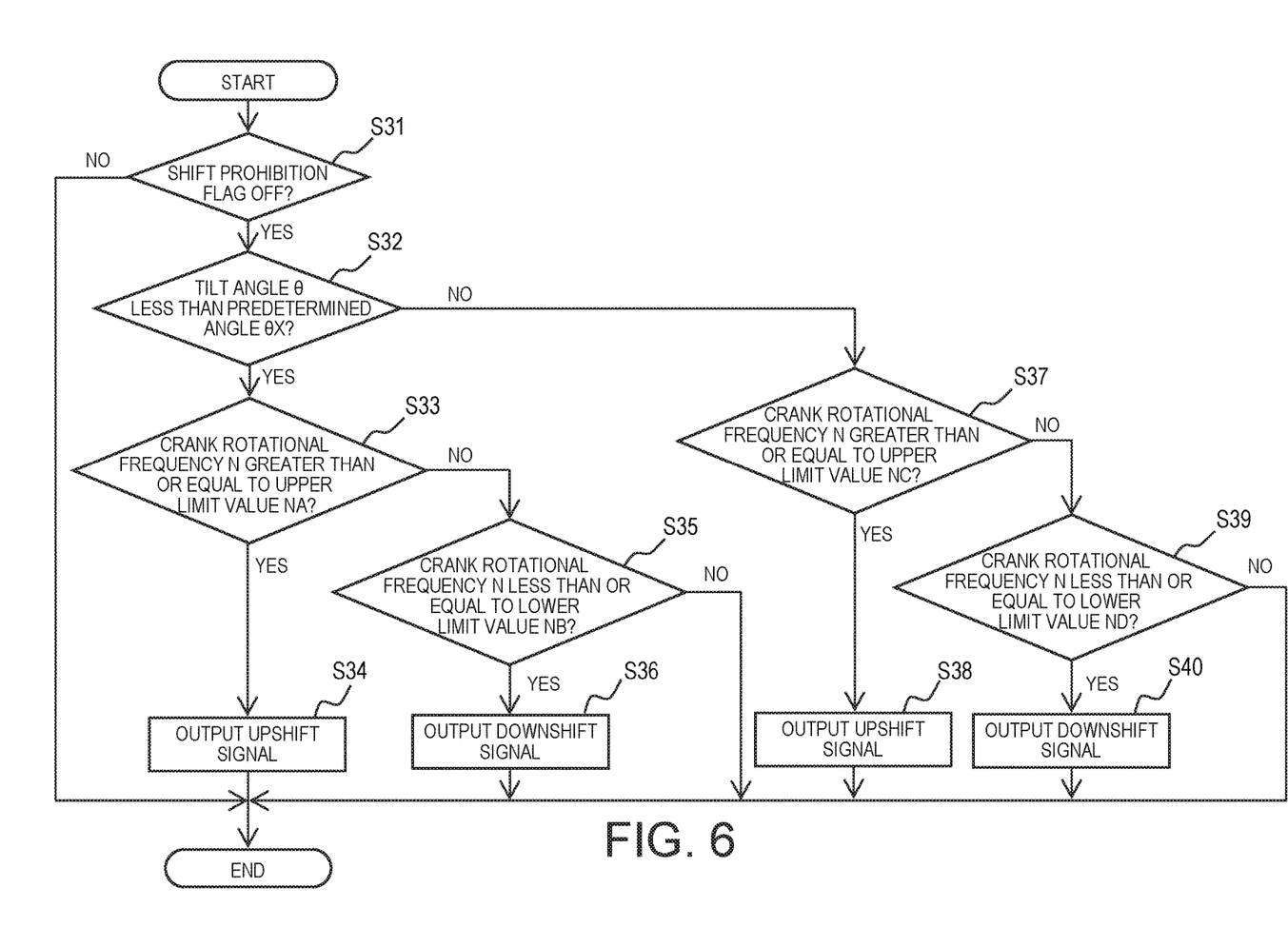
FIG. 6 is a flowchart of a shifting process executed by the controller of FIG. 3.

The steps S37-S40 can be omitted from the shifting process shown in FIG. 6. In this case, when the tilt angle θ is less than the predetermined angle θX, the controller 54 ends the shifting process and executes the process from step S31 again after a predetermined period. Further, a shift control that is appropriate for traveling uphill can be executed, instead of the process of steps S37-S40.

Figure 10:
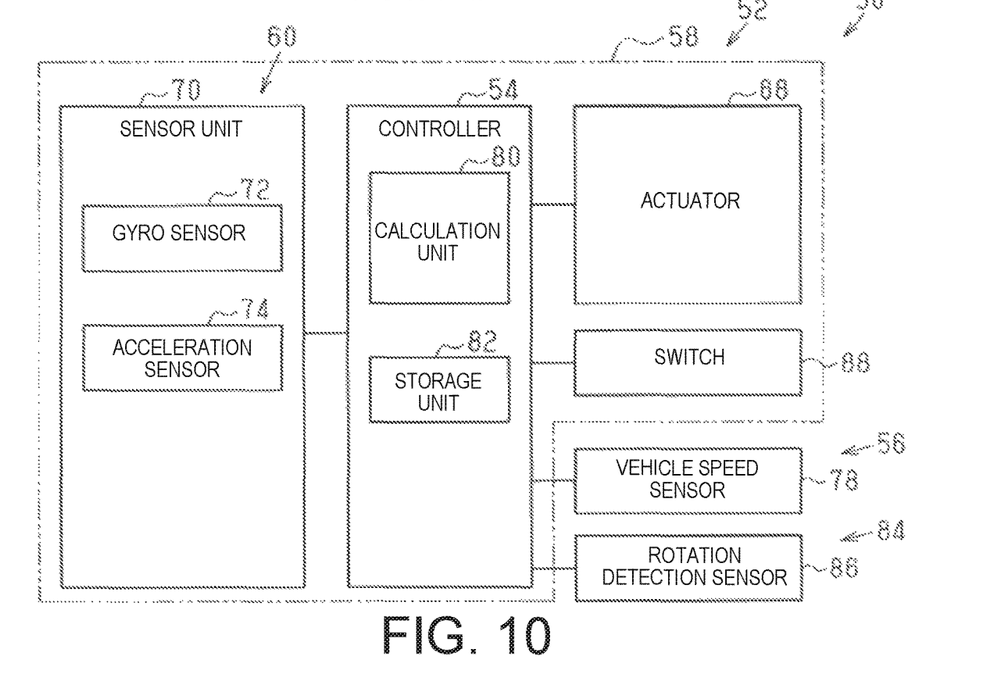
FIG. 10 is a block diagram of a transmission control system of a modified example of the embodiment.

As shown in FIG. 10, a switch 88 can be disposed on the transmission device 52 as well for setting the initial value of the tilt angle θ. In this case, the operator places the bicycle 10 in a flat location in a stopped state. The operator sets the gear shift stage to a reference stage (for example, first stage) and presses the switch 88. The controller 54 stores the tilt angle θ of when the switch 88 is pressed as the initial value to the storage unit 82. The controller 54 calculates the tilt angle θ based on the stored initial value in step S15, which is the calculation process for the tilt angle θ. The initial value of the tilt angle θ can be set using a computer that can be connected to the controller 54 by wire or wireless, instead of the switch 88.

An air pressure sensor can be mounted on the bicycle 10 as well. In this case, the air pressure sensor can be disposed on the transmission 58, the crank assembly 34, the operating device 20, or an operating device that operates the brake. Meanwhile, the air pressure sensor can also be disposed on the front derailleur or an internal transmission instead of the transmission 58.

A temperature sensor can be mounted to the bicycle 10 as well. In this case, the temperature sensor can be disposed on the transmission 58, the crank assembly 34, the operating device 20, or an operating device that operates the brake. Meanwhile, the temperature sensor can also be disposed on the front derailleur or an internal transmission instead of the transmission 58.

A wind-force sensor can be mounted to the bicycle 10 as well. In this case, the wind-force sensor can be disposed on the transmission 58, the crank assembly 34, the operating device 20, or an operating device that operates the brake. Meanwhile, the wind-force sensor can also be disposed on the front derailleur or an internal transmission instead of the transmission 58.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A bicycle transmission device comprising:
   a transmission configured to change a gear ratio of a bicycle; and
   a tilt sensor disposed on the transmission and that outputs a signal that reflects an inclination of the transmission, the tilt sensor comprising an acceleration sensor that outputs acceleration information of the bicycle; and
   a bicycle transmission control apparatus including a controller that is configured to control an actuator based on an output of the tilt sensor and configured to control the actuator so to not perform a chance of the gear ratio when a detected acceleration of the bicycle is greater than a predetermined value, the sampling frequency of the tilt sensor being different from an oscillation frequency of the transmission when the transmission is operating.

2. The bicycle transmission device as recited in claim 1, wherein
   the transmission includes a derailleur, and
   the derailleur comprises a base member that is configured to be attached to a frame of the bicycle, a movable member that is configured to move with respect to the base member, and a coupling member that couples the base member and the movable member.

3. The bicycle transmission device as recited in claim 2, wherein
the tilt sensor is disposed on the base member.

4. The bicycle transmission device as recited in claim 1, wherein
the tilt sensor has a sampling frequency that is less than or equal to 20 hertz.

5. The bicycle transmission device as recited in claim 4, wherein
the sampling frequency of the tilt sensor is less than or equal to 10 hertz.

6. The bicycle transmission device as recited in claim 1, wherein
the sampling frequency of the tilt sensor is lower than the oscillation frequency of the transmission when the transmission is operating.

7. The bicycle transmission device as recited in claim 1, wherein
the tilt sensor further comprises a gyro sensor.

8. The bicycle transmission device as recited in claim 1, wherein
the transmission further comprises the actuator that changes the gear ratio by operating the transmission.

9. The bicycle transmission device as recited in claim 1, wherein
the controller is configured to control the actuator based on outputs of the tilt sensor, and of a vehicle speed sensor which outputs a signal that reflects a vehicle speed of the bicycle.

10. The bicycle transmission device as recited in claim 1, wherein
the controller is configured to vary the control of the actuator based on the tilt sensor, between a first state in which an acceleration is greater than a first predetermined value and a second state in which the acceleration is less than or equal to the first predetermined value.

11. The bicycle transmission device as recited in claim 9, wherein
the controller is configured to calculate a tilt angle of the bicycle based on the output of the tilt sensor.

12. The bicycle transmission device as recited in claim 11, wherein
the controller is configured to calculate the tilt angle of the bicycle based on the outputs of the tilt sensor and the vehicle speed sensor.

13. The bicycle transmission device as recited in claim 11, wherein
the controller is configured to correct the tilt angle according to a gear shift stage of the transmission.

14. The bicycle transmission device as recited in claim 11, wherein
the controller comprises a storage unit that stores a correction value for each of the gear shift stages of the transmission, and corrects the tilt angle based on the correction value.

15. The bicycle transmission device recited in claim 1, wherein
the controller is disposed on the transmission.

16. A bicycle transmission control system comprising:
a transmission device equipped with a transmission and an actuator that is configured to change a gear ratio of a bicycle by operating the transmission;
a tilt sensor disposed on the bicycle and that outputs a signal that reflects an inclination of the bicycle, the tilt sensor comprising an acceleration sensor that outputs acceleration information of the bicycle; and
a controller configured to control the actuator based on an output of the tilt sensor and configured to control the actuator so to not perform a change of the gear ratio when a detected acceleration of the bicycle is greater than a predetermined value, wherein a sampling frequency of the tilt sensor is less than or equal to 20 hertz.

17. A bicycle transmission control system comprising:
a transmission device equipped with a transmission and an actuator that is configured to change a gear ratio of a bicycle by operating the transmission;
a tilt sensor disposed on the bicycle and that outputs a signal that reflects an inclination of the bicycle; and
a controller configured to control the actuator based on an output of the tilt sensor,
the output of the tilt sensor including acceleration information, and
the controller being configured to vary the control of the actuator based on the tilt sensor, between a first state in which an acceleration of the bicycle is greater than a first predetermined value and a second state in which the acceleration is less than or equal to the first predetermined value.

18. The bicycle transmission control system as recited in claim 17, wherein
the controller is configured to not perform a change of the gear ratio based on the output of the tilt sensor, in the first state.

19. Time bicycle transmission control system as recited in claim 17, wherein
the acceleration of the bicycle is an acceleration in a longitudinal direction of the bicycle.

20. A bicycle transmission device comprising:
a transmission configured to change a gear ratio of a bicycle; and
a tilt sensor disposed on the transmission and that outputs a signal that reflects an inclination of the transmission; and
a bicycle transmission control apparatus including
a storage unit that stores a correction value for each of the gear shift stages of the transmission, the storage unit having a prestored correction table with correction values of the tilt information for each gear stage of the transmission, and
a controller that is configured to control the actuator based on an output of the tilt sensor, the sampling frequency of the tilt sensor being different from an oscillation frequency of the transmission when the transmission is operating, the controller being configured to calculate a tilt angle of the bicycle based on the output of the tilt sensor, the controller being configured to correct the tilt angle according to a gear stage of the transmission.

* * * * *